Patented Mar. 23, 1954

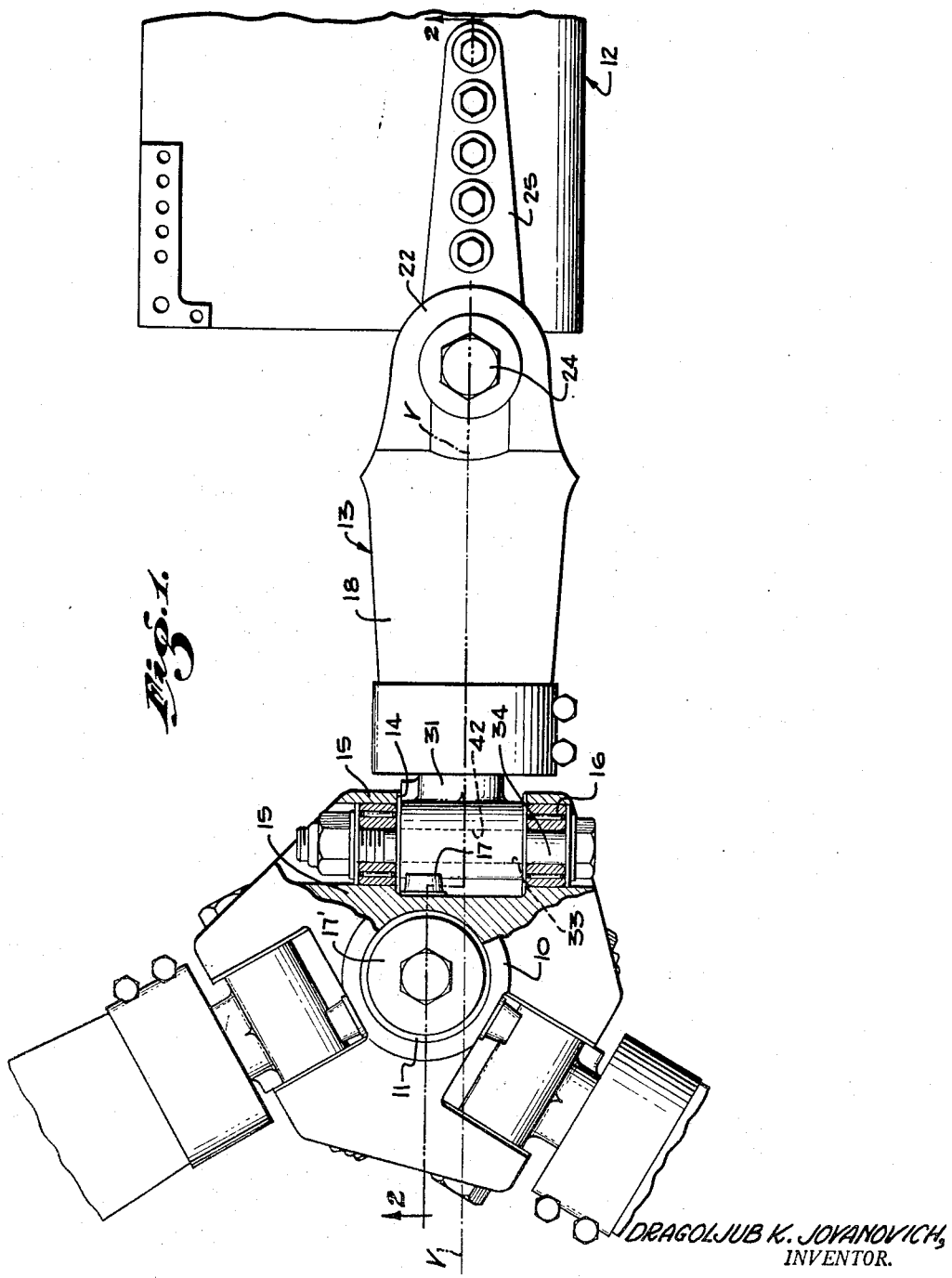

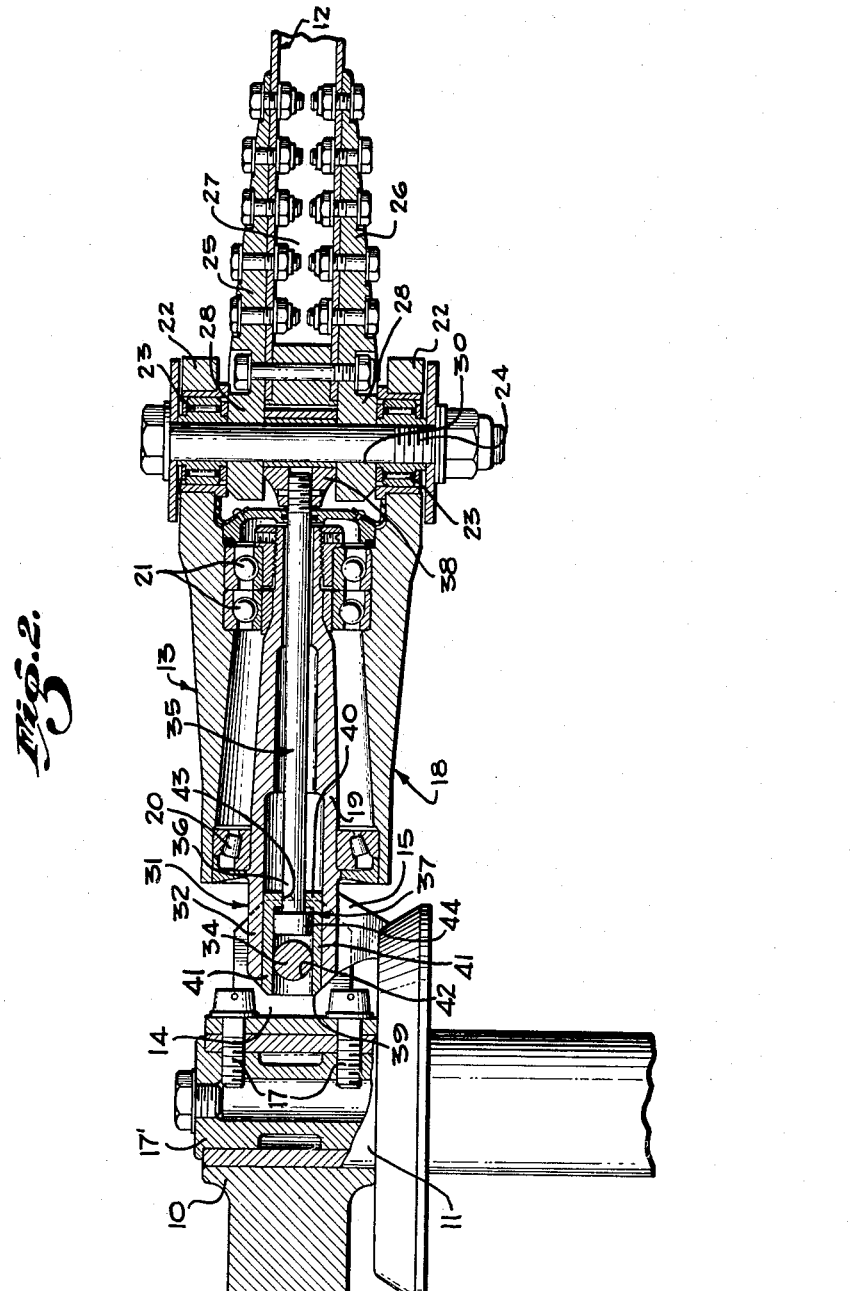

2,672,941

UNITED STATES PATENT OFFICE 2,672,941

MEANS FOR CONNECTING ROTOR BLADES TO ROTOR BODIES

Dragoljub K. Jovanovich, Redondo Beach, Calif., assignor to McCulloch Motors Corporation, Los Angeles, Calif., a corporation of Wisconsin Application October 4, 1951, Serial No. 249,679

9 Claims. (Cl. 170—160.56)

This invention relates to sustaining rotors such as employed on helicopters or the like, and relates in particular to a sustaining rotor having a simple and effective means for connecting the rotor blades to a rotor body.

It is an object of the invention to provide a compact yet durable means for connecting the blades of a sustaining rotor to the rotor body, having a swivel connection one end of which is hingedly connected to the rotor body and the other end of which is hingedly connected to the blade, this swivel connection making possible axial rotation of the blade so that the pitch of the blade may be readily varied.

It is an object of the invention to provide a means for connecting a rotor blade to the rotor body comprising a swivel connection and in addition to this swivel connection an auxiliary connecting means which acts independently of the swivel connection in event of failure thereof to prevent separation of the blade from the body.

A further object of the invention is to provide a means connecting a sustaining blade to a rotor body having a swivel connection and an auxiliary connection which extends axially through the swivel connection for securing the blade to the body in event of failure of the primary swivel connection.

It is an object of the invention to provide a connecting means such as set forth in the preceding paragraphs having primary and auxiliary swivel connections and wherein the ends of the primary swivel connection are connected by pins to the rotor body and to the inner end of the blade, and the auxiliary connecting means extends axially through the primary swivel connection and has the ends thereof connected to the intermediate portions of the pins.

Further objects and advantages of the invention will be brought out in the following part of the specification wherein, for the purpose of completeness of disclosure, a preferred embodiment has been described in close detail, without limiting the scope of the invention set forth in the appended claims. Referring to the drawings which are for illustrative purposes only:

Fig. 1 is a fragmentary plan view partly in section, showing my invention incorporated in a sustaining rotor for aircraft; and Fig. 2 is a fragmentary sectional view taken as indicated on the line 2—2 of Fig. 1.

In Fig. 1, I have shown an aircraft sustaining rotor comprising a rotor body 10 secured on the upper end of a shaft 11, and being arranged to support a plurality of sustaining blades, the inner end of one of these blades being shown and indicated by the numeral 12, and primary connecting means 13 for securing the blades to the rotor body. Corresponding to the number of blades in the sustaining rotor, the rotor body 10 has outwardly faced recesses or spaces 14 defined by spaced side walls 15 which carry bearings 16 aligned on transverse axes which are horizontal when the shaft 11 is vertical. The rotor body 10 is secured to the upper end of the shaft 11 by screws 17 which are threaded into an insert 17' adapted to close the upper end of the shaft 11.

Since the primary connecting means 13 are identical, only one of them will be described. Each primary connecting means 13 is in the form of a swivel connection comprising swivel parts 18 and 19 disposed in telescoping relation. The parts 18 and 19 are shown respectively as outer and inner parts, but this order may be reversed. The swivel parts 18 and 19 are connected for relative rotation on a common axis by bearings 20 and 21 disposed in the manner shown. The outer end of the outer swivel part 18 has spaced lugs 22 which support bearings 23 arranged to carry a transverse pin 24 which lies in a vertical plane v—v which passes close to the vertical axis of the shaft 11, the pin 24 cooperating with other parts to form a hinge on which the blade 12 may swing horizontally. To complete this hinge, plates 25 and 26 are secured to the upper and lower faces of the inner end 27 of the blade 12, these plates 25 and 26 providing spaced members 28 which are disposed in spaced relation and lie in overlapping relation to the lugs 22 and have openings 30 to receive portions of the pin 24.

The inner end of the swivel part 19 projects from the swivel part 18 and has thereon a head 31 which extends into the space 14 between the side walls 15 of the rotor body 10. This head 31 has side wall portions or side wall members 32 in spaced relation provided with opening 33 to receive a pin 34 the outer ends of which are carried by the bearings 16. This transverse pin 34 is disposed horizontally and therefore permits an up and down swinging movement of the swivel connecting means 13 and the blade 12. The transverse pins 24 and 34 are angularly orientated 90° around the axis of the swivel connecting means 13 so that the blade 12 may have up and down and also lateral swinging movement.

The invention includes an auxiliary swivel connection 35 for the rotor body 10 and the blade 12 in coaxial relation to the primary swivel connection 13. This auxiliary swivel connection 35 comprises two parts 36 and 37 in swivelled relation. The part 36 comprises a pin extending within the swivel part 19 and projecting from the outer end thereof. The projecting end of the pin 36 is connected to the intermediate portion of the transverse pin 24 by a head 38 which lies between the spaced members 28 provided by the plates 25 and 26 and is bored to receive the intermediate portion of the shaft 24. The head 38 is threaded onto the projecting end of the swivel part 36. The auxiliary swivel part 37 also comprises a metal cup 39 having an end wall 40 and a side wall 41 provided with openings 42 through which the intermediate portion of the pin 34 passes, thereby connecting the swivel part 37 to the intermediate portion of the pin 34. The inner end of the swivel part 36 projects through an opening 43 in the end wall 40 into the interior of the cup member 39, and on the swivel part 36, within the cup member 39, there is a head 44. The head 44 of the swivel part 36 is spaced from the bottom wall 40 of the cup 39 so that the auxiliary swivel connection 35 carries no load as long as the primary swivel connection 17 transmits the loads of the blade 12 and the connecting means to the transverse pin 34. Should the outer swivel part 18 rupture at a point outwardly of the outer thrust bearing 21, should the inner swivel part 19 rupture at a point intermediate the ends thereof, or should the outer swivel part 18 for any reason whatsoever be permitted to slide outwardly on the inner swivel part 19, the head 44 of the auxiliary swivel part 36 will be brought into engagement with the end wall 40 of the cup member 39 so that the radial blade load ordinarily transmitted through transverse pin 24 and the primary swivel connecting means 13 to the pin 34 will be then carried by the auxiliary swivel connection 35 and separation of the rotor blade 12 from the rotor body 10 will be prevented.

I claim:

1. In a sustaining rotor for aircraft: a rotor body; a rotor blade; a pair of swivel parts connected for relative rotation on a common axis; transverse hinge means connecting the inner end of one of said swivel parts to said body; transverse hinge means connecting the outer end of the other of said swivel parts with the inner end of said blade, said last named hinge means being angularly orientated with relation to said first named hinge means; and means connecting said rotor body and said blade for relative rotation on said axis, independently of said swivel parts.

2. In a sustaining rotor for aircraft: a rotor body; a rotor blade; a pair of swivel parts connected for relative rotation on a common axis; transverse hinge means connecting the inner end of one of said swivel parts to said body so that said swivel parts may swing up and down; transverse hinge means connecting the outer end of the other of said swivel parts with the inner end of said blade, so that said blade may swing horizontally; and means connecting said rotor body and said blade for relative rotation on said axis, independently of said swivel parts.

3. In a sustaining rotor for aircraft: a rotor body; a rotor blade; a pair of swivel parts connected for relative rotation on a common axis; transverse hinge means connecting the inner end of one of said swivel parts to said body; transverse hinge means connecting the outer end of the other of said swivel parts with the inner end of said blade, said last named hinge means being angularly orientated with relation to said first named hinge means; and auxiliary swivel means extending axially through said swivel parts and connecting said hinge means so that in event of failure of said swivel parts said auxiliary swivel means will prevent separation of said blade from said body.

4. In a sustaining rotor for aircraft: a rotor body; a rotor blade; a pair of swivel parts connected for relative rotation on a common axis; transverse hinge means connecting the inner end of one of said swivel parts to said body so that said swivel parts may swing up and down; transverse hinge means connecting the outer end of the other of said swivel parts with the inner end of said blade, so that said blade may swing horizontally; and auxiliary swivel means extending axially through said swivel parts and connecting said hinge means so that in event of failure of said swivel parts said auxiliary swivel means will prevent separation of said blade from said body.

5. In a sustaining rotor for aircraft: a rotor body; a rotor blade; a pair of swivel parts connected for relative rotation on a common axis; transverse hinge means comprising a pin connecting the inner end of one of said swivel parts to said body; transverse hinge means comprising a pin connecting the outer end of the other of said swivel parts with the inner end of said blade; and means connecting said pins of said hinge means independently of said swivel parts.

6. In a sustaining rotor for aircraft: a rotor body; a rotor blade; a pair of swivel parts connected for relative rotation on a common axis; transverse hinge means comprising a pin connecting the inner end of one of said swivel parts to said body; transverse hinge means comprising a pin connecting the outer end of the other of said swivel parts with the inner end of said blade; and auxiliary swivel means extending axially through said swivel parts and connecting the central portions of said pins of said hinge means so that in event of failure of said swivel parts said auxiliary swivel means will prevent separation of said blade from said body.

7. In a sustaining rotor for aircraft: a rotor body having spaced walls defining a radially outwardly faced space; a transverse pin extending across said space; a first swivel sleeve having spaced lugs mounted on said pin within said space; a second swivel sleeve in telescoping relation to said first sleeve and being connected thereto for relative rotation on a common axis, said second swivel sleeve having spaced lugs projecting from the outer end thereon; spaced members extending from the inner end of said blade and overlapping said spaced lugs of said second sleeve; a pin extending through said spaced members and said lugs of said second sleeve; and auxiliary connecting means extending axially through said sleeves and having the end portions thereof connected to the intermediate portions of said pins.

8. In a sustaining rotor for aircraft: a rotor body; a rotor blade; a pair of swivel parts connected for relative rotation on a common axis; transverse hinge means comprising a pin connecting the inner end of one of said swivel parts to said body; transverse hinge means comprising a pin connecting the outer end of the other of said swivel parts with the inner end of said blade; and auxiliary swivel means extending axially through said swivel parts and connecting the central portions of said pins of said hinge means so that in event of failure of said swivel parts said auxiliary swivel means will prevent separation of said blade from said body, said auxiliary means comprising axially arranged parts having transverse shoulders for interengagement to transmit axial load from one of said pins to the other, said shoulders being spaced so as to provide axial play between said axially arranged parts.

9. In a sustaining rotor for aircraft: a rotor body; a rotor blade; a pair of swivel parts connected for relative rotation on a common axis; transverse hinge means connecting the inner end of one of said swivel parts to said body; transverse hinge means connecting the outer end of the other of said swivel parts with the inner end of said blade, said last named hinge means being angularly orientated with relation to said first named hinge means; and means connecting said rotor body and said blade for relative rotation on said axis, independently of said swivel parts, said last named means comprising axially arranged parts having transverse shoulders for interengagement to transmit axial load from said rotor blade to said rotor body, said shoulders being spaced so as to provide axial play between said axially arranged parts so that said axially arranged parts will be normally unloaded.

DRAGOLJUB K. JOVANOVICH.

References Cited in the file of this patent

UNITED STATES PATENTS

| Number | Name | Date |
|---|---|---|
| 2,356,692 | Platt | Aug. 22, 1944 |
| 2,430,767 | Hirsch | Nov. 11, 1947 |